July 9, 1940.  R. L. MARTENS ET AL  2,207,466
BEARING DEVICE FOR RECIPROCAL MOTIONS
Filed March 28, 1938  3 Sheets-Sheet 1
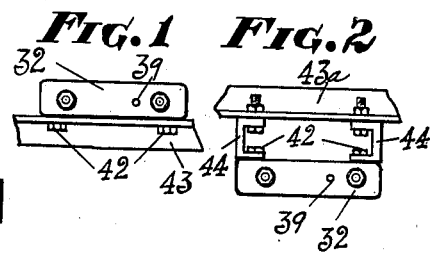
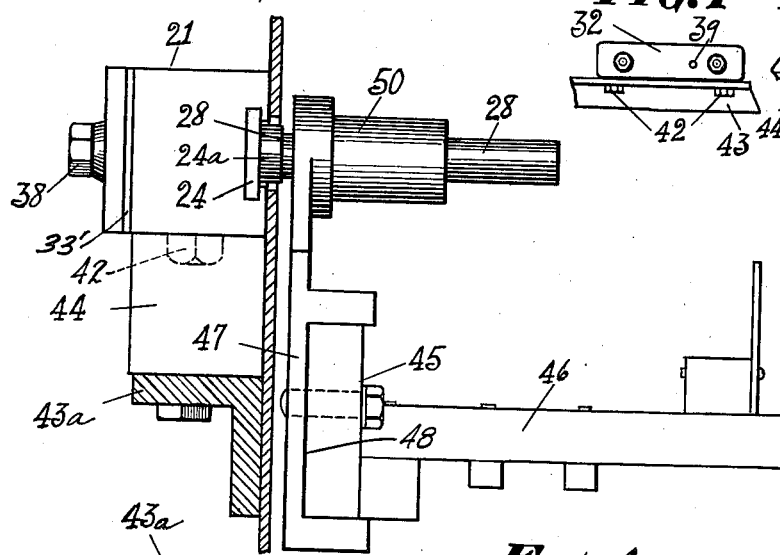
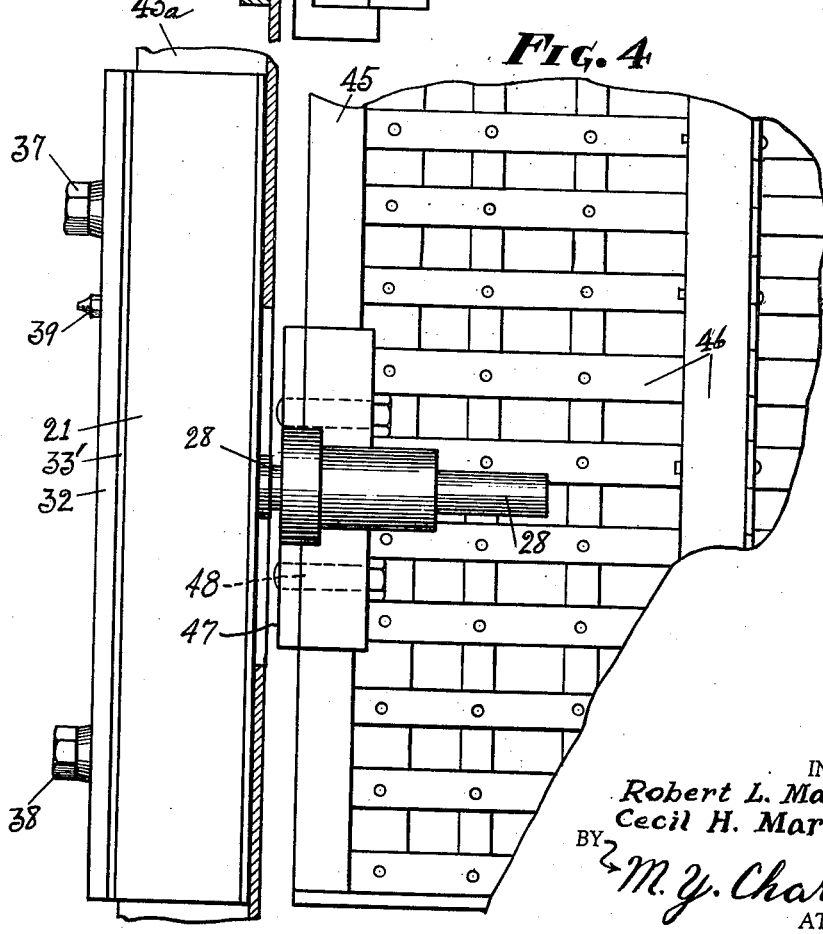
INVENTORS
Robert L. Martens and
Cecil H. Martens
BY M. Y. Charles
ATTORNEY.

July 9, 1940.    R. L. MARTENS ET AL    2,207,466
BEARING DEVICE FOR RECIPROCAL MOTIONS
Filed March 28, 1938    3 Sheets-Sheet 2
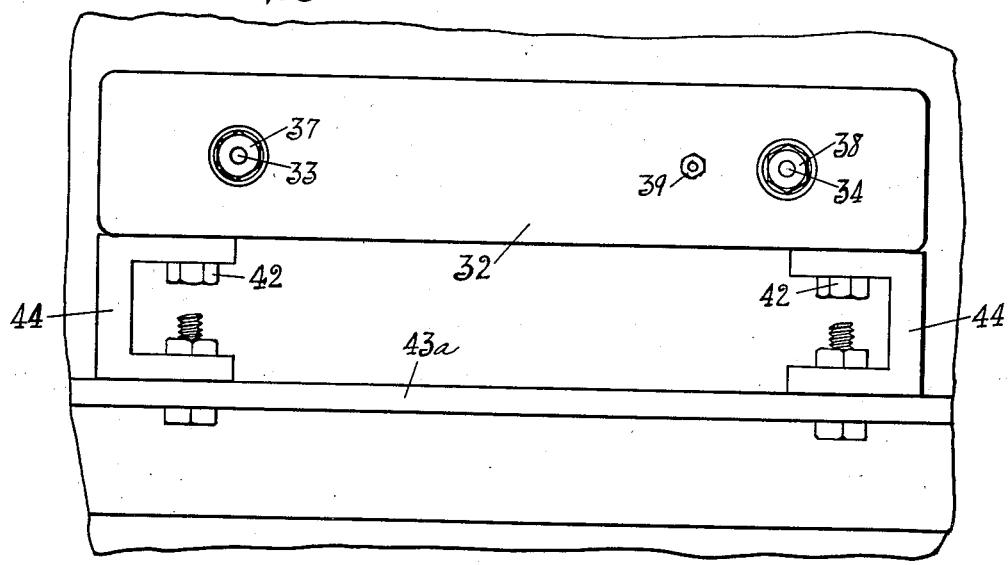
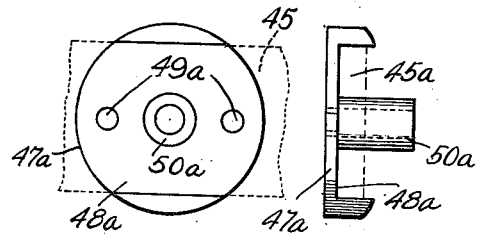 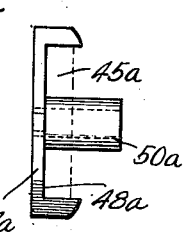 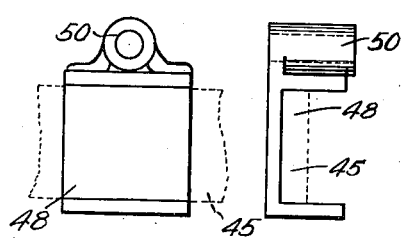
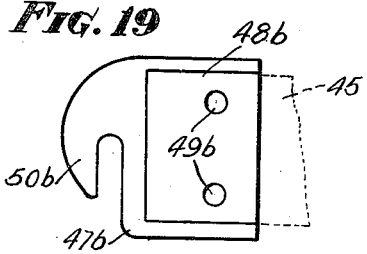 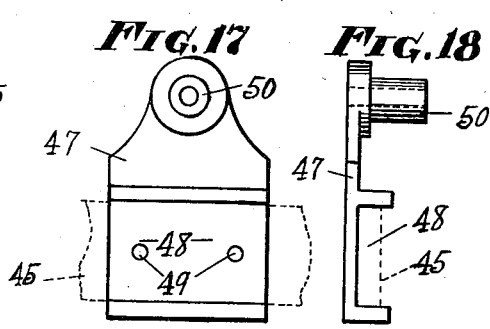
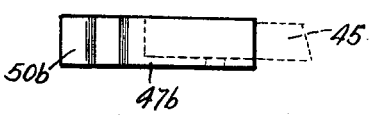
INVENTORS
Robert L. Martens and
BY Cecil H. Martens
M. Y. Charles
ATTORNEY.

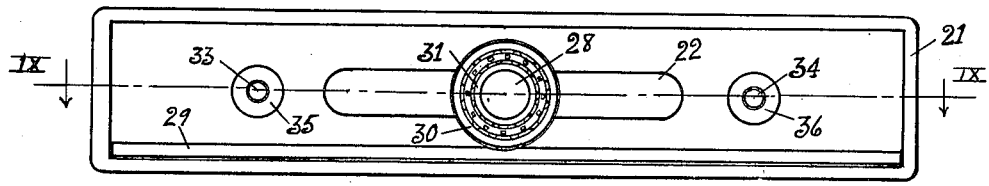
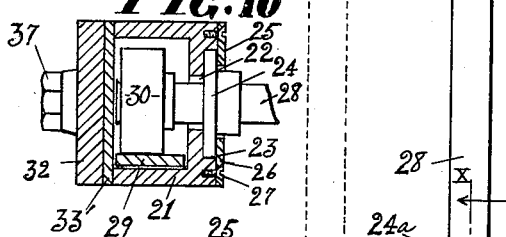
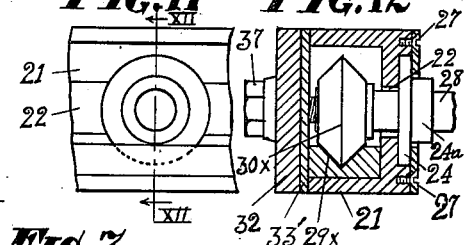
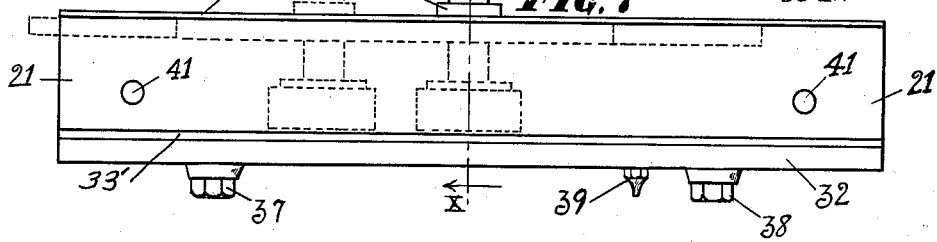
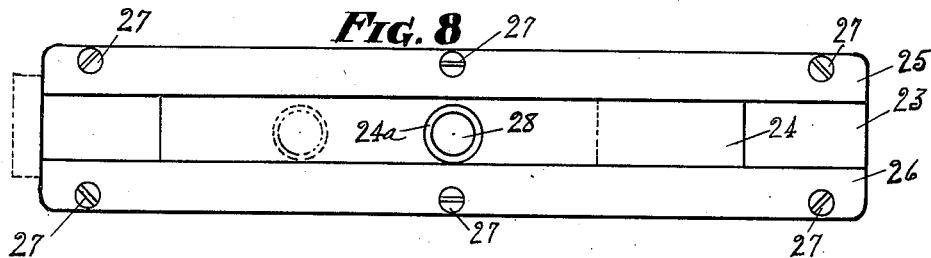
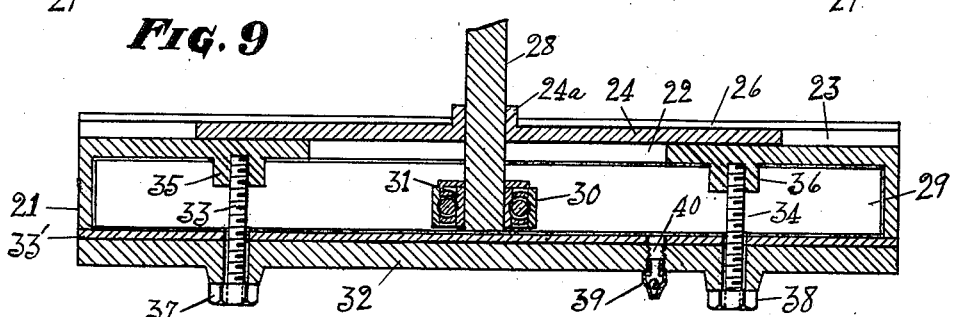

Patented July 9, 1940

2,207,466

UNITED STATES PATENT OFFICE 2,207,466

BEARING DEVICE FOR RECIPROCAL MOTIONS

Robert L. Martens and Cecil H. Martens, Clearwater, Kans.

Application March 28, 1938, Serial No. 198,420

2 Claims. (Cl. 308—6)

Our invention relates to an improvement in bearing devices for reciprocal motions.

This device is applicable for use in carrying sieves, straw racks, and the like in threshing machines and combine harvesters.

While we have developed the bearing device for the purpose mentioned it is obvious that the device is applicable to other types of machinery in which there are reciprocal motions.

In applying our invention to threshing machines and combined harvesters it will be understood that those bearings will be employed preferably one to each corner of the sieve or other element that is to be supported.

The object of our invention is to provide a bearing unit which will be long lived, and one that will have a minimum amount of wear, and when such wear does occur, it can be cheaply and quickly taken out.

A further object is to provide a device of the kind mentioned in which provision is made for eliminating end movement of the supporting pin.

A still further object is to provide a bearing of the kind mentioned which is housed so that the bearing may be well lubricated and the possibilities of dirt and foreign matter entering the device is eliminated.

These and other objects will be more fully illustrated as this description progresses.

Now referring to the accompanying drawings, Fig. 1 is a side view of the bearing device as it is preferably applied to a frame member of a threshing machine. Fig. 2 is a side view of the bearing device showing a modified form of mounting for the device; the device being suspended from a frame member of a threshing machine. Fig. 3 is an enlarged detail end view of the bearing device and associated parts, the bearing device being supported above the supporting frame of a machine. Fig. 4 is a plan view of the device and associated parts shown in Fig. 3. Fig. 5 is a side view of the bearing device and associated parts shown in Figures 3 and 4. Fig. 6 is a view of the front side of the bearing device, the cover plate being removed for convenience of illustration. Fig. 7 is a plan view of the bearing device illustrating the movements of the device as it works. Fig. 8 is a view of the back side of the housing for the bearing. Fig. 9 is a sectional view through the device, the view being taken along the line IX—IX in Fig. 6, the cover plate being shown in Fig. 9 while the cover plate is removed in Fig. 6. Fig. 10 is a detail sectional view of the device, the view being taken along the line X—X in Fig. 7. Fig. 11 is a front view of a modified form of the invention, the cover plate being removed for convenience of illustration. Fig. 12 is a sectional view taken on the line XII—XII in Fig. 11, the cover plate being shown in position in this view. Fig. 13 is a front view of one of the hangers employed to receive the supporting pin of the bearing and also to hold the side rail of a sieve or straw rack. Fig. 14 is an edge view of the hanger shown in Fig. 13. Fig. 15 is a front view of a modified form of a hanger used for the same purpose as that shown in Figs. 13 and 14. Fig. 16 is an edge view of the hanger shown in Fig. 15. Fig. 17 is a front view of still another modified form of a hanger used for the same purpose as that shown in Figures 13 and 14. Fig. 18 is an edge view of the hanger device shown in Fig. 17. Fig. 19 is a side view of a hanger hook that may be employed to hook on the bearing pin and support one end of a rail of a sieve or straw rack. Fig. 20 is a bottom plan view of the hanger hook shown in Fig. 19.

Similar numerals of reference designate the same part throughout the several figures of the drawings.

In the drawings is shown a box like element 21 having the top, bottom, ends and back side made in one integral piece. The back of the box is provided with an elongated slot 22 which is positioned parallel with the bottom of the box. In the outside face of the back wall of the box is a groove 23 in which the slot 22 is parallelly positioned. In the groove 23 is slidably positioned a plate 24. At 25 and 26 are plates positioned on the back side of the back of the box and the edges thereof overlap the top and bottom edges of the plate 24 to form a track in which the plate 24 slides and is retained in. The plates 25 and 26 are preferably attached to the back of the box like element by screws 27 that pass through the plates 25 and 26 and are threaded into the back wall of the box like element.

At 28 is a pin element that passes through a hole in the plate 24. Around the hole and integrally formed on the plate 24 is an outwardly extending flanges 24a in which the pin is tightly fitted so that one end of the pin 28 extends outwardly from the plate 24 and the other end of the pin 28 extends inwardly into the interior of the box like element as illustrated in Fig. 9.

Now it is obvious that the pin 28 may be moved back and forth in the slot 22 whereupon the plate 24 will slide in the track formed with the plates 25 and 26 and the groove 23 in the back side of the box like element.

Inside of the box like element and positioned on the floor thereof, is a plate like element or a track 29 on which rests the external member 30 of an anti-friction bearing. The internal member 31 of the anti-friction bearing is tightly fitted on the inner end of the shaft 28 so that the shaft 28 is supported by the bearing which bears on and is adapted to roll on the track element 29. The box like element 21 is provided with a cover plate 32, there being a gasket 33 positioned between the cover plate 32 and the edges of the wall of the box like element 21. The plate 32 is slidably held in position in the box like element 21 by means of stud bolts 33 and 4 which are threaded into boss elements 35—36, that are integrally formed on the back wall of the box like element 21 and the studs 33—34, projected through holes in the cover plate 32 to receive nuts 37—38 to slidably bind and hold the cover plate 32 on the box like element 21.

Attention is called to the fact that the gasket 33' forms an oil tight joint between the cover plate 32 and the walls of the box like element 21. At 39 is an oiler that is threaded into a hole 40 in the cover plate 32 so that a grease gun may be applied to the oiler 39, whereupon grease may be injected into the box like element 21, for the purpose of lubricating the working parts of the anti-friction bearings as well as lubricating the back side of the plate 24 so that it will easily slide in the track it is carried in.

At places where desired, the box like element 21 may be provided with holes 41 that may be threaded to receive bolts 42 that may be passed through a frame element 43 and threaded into the box like element 21 as means of securing the box like element 21 on the supporting element 43.

There may be instances where it is desirable to support or suspend the box-like element 21 a spaced distance above or below the supporting frame member. This may be done by the employment of bracket like elements 44 which may be positioned between the box like element and the supporting frame member 43a as shown in Figs. 1, 2, 3, 4 and 5.

In Figs. 3, 4 and 5 is shown an application of the device in which is shown a side rail 45 of a straw rack 46, the rail 45 being carried in a hanger 47 that is provided with a channel like portion 48 in which the rail 45 is seated and rigidly held therein by means of screws or bolts which may be passed through the holes 49 in the hangar 47 and into or through the rail 45 as will readily be understood.

In Figures 13 and 14 is shown a modified form of the hanger in which the side rail 45 is positioned in a channel portion 48a formed in a circular plate element 47a, and at the middle of the circular plate element 47a is a bearing sleeve 50a extending inwardly through the channel formation 48a that will receive the bearing pin 28 so as to support the rail 45 of the sieve or rack as the case may be. At 49a is shown holes in the plate 47a for screw or bolt fastenings of the plate 47a to the rail 45 as previously described.

In Figures 15 and 16 is shown hanger elements similar to that shown in Figures 17 and 18, the only difference being that the bearing sleeve 50 is positioned closer to the channel 48 than it is in the Figures 17 and 18.

In Figures 19 and 20 is shown still another modification of the hanger. This design is adapted to receive the end of the rail 45, which is seated in a channel like formation 48b that is formed in a block 47b, there being holes 49b in the block 47b to admit the passage of screws or bolts into the rail 45 so as to hinge the rail 45 to the hanger as will be readily understood. The block 47b is provided with a hook portion 50b that is adapted to hook over the bearing pin 28 so as to support the rail 45 the same as shown in Figures 3 and 4.

The hanger 47 is provided with an integrally formed sleeve like portion 50 which is adapted to be slipped on the pin 28 so as to support the straw rack or sieve 46 so that the sieve or straw rack may be moved back and forth in the usual manner. In this movement the load of the sieve or straw rack is transmitted through the pin 28 to the anti-friction bearing, the external portion of which rest and will roll back and forth on the plate 29 in accordance with the movement of the element 46.

There may be occasions when the shaft 28 may be urged end ways, or so as to have end play. This may be overcome by making the track plate 29 with a V-shaped cut 29x in the upper face thereof, as shown in Fig. 12, and then making the external portion of the anti-friction bearing V-shaped as at 30x so as to be received in and run in the V-shaped groove 29x. This arrangement will guide the bearing as it rolls and will prevent end movement of the pin 28.

The track 29 merely lays on the bottom of the box like element and fits between the back and end walls and cover plate 32 of the box like element. Therefore if the track 29 becomes worn, it is only necessary to remove the cover plate 32, whereupon the track 29 may be readily slipped from the box like element and replaced with a new one.

Such modifications may be employed as lie within the scope of the appended claims without departing from the spirit and intention of our invention. Now having fully described our invention, what we claim as new and desire to secure by Letters Patent is:

1. In a bearing device for reciprocal motions; said device including a box-like element having a track in the bottom thereof for the support of a rollable element; one side of said box-like element being removably attached to said box-like element, the opposite side of said box-like element having a slot in the central portion and a channel formed in the outer face of the second said side of said box-like element in such a position that the said slot is centered in said channel, a plate, said plate being slidably mounted in said channel and covering said slot, and means on the second said side of said box-like element for holding said plate in said channel, said plate having an opening therein for the reception of a shaft, a load carrying shaft, said shaft passing through and snugly fitting within said opening in said plate, an anti-friction bearing, said bearing being mounted on the inner end of said shaft within said box-like element and bearing on said track for the support of said shaft, said plate being of sufficient length that the said shaft and plate may be moved in a reciprocal motion in said channel so that the plate will at all times form a closure over said slot.

2. In a bearing device for reciprocal motion as defined in claim 1, said track being removable from said box-like element upon the removal of the removable side of said box-like element.

ROBERT L. MARTENS.
CECIL H. MARTENS.